UNITED STATES PATENT OFFICE.

JAMES WRIGHT, OF CHARLESTON, ILLINOIS.

SOAP.

SPECIFICATION forming part of Letters Patent No. 241,469, dated May 10, 1881.

Application filed March 3, 1881. (No specimens.)

*To all whom it may concern:*

Be it known that I, JAMES WRIGHT, of Charleston, in the county of Coles, and in the State of Illinois, have invented certain new and useful Improvements in Soap; and I do hereby declare that the following is a full, clear, and exact description thereof.

This invention has for its objects to provide an improved soap by means of which clothes of any description may be cleansed without rubbing, which will thoroughly cleanse glassware, silverware, earthenware, and the like, and which will form a valuable curative agent in the case of sores or scratches on cattle or stock and for chapped hands and other similar diseases of the human body.

My invention consists of a composition consisting of the following ingredients—viz: soap, alum, borax, sal-soda, lime, benzine, alcohol, glycerine, rosin, and palm-oil. These ingredients may be combined in any convenient manner and in any suitable proportions. In practice I have found the following method and proportions to answer well—viz: soap, either hard or soft, three and one-half pounds; alum, one-half ounce; borax, three-fourths of an ounce; sal-soda, one-fourth of a pound; lime, one-half ounce; benzine, one-half ounce; alcohol, one and one-half ounce; glycerine, two and one-half ounces; rosin, two ounces; palm-oil, two ounces. The alum is dissolved in three-fourths of an ounce of water and added to the soap, which is suitably dissolved in water. The other ingredients are then added and the whole incorporated by the aid of heat, if desired.

Having thus described my invention, what I claim, and desire to secure by Letters Patent, is—

The within-described compound soap, consisting of soap, either hard or soft, alum, borax, sal-soda, lime, benzine, alcohol, glycerine, rosin, and palm-oil, in about the proportions named.

In testimony that I claim the foregoing I have hereunto set my hand this 2d day of February, 1881.

JAMES WRIGHT.

Witnesses:
H. C. TOWLES,
E. W. RICKETTS.